(12) United States Patent
Miyazaki et al.

(10) Patent No.: US 11,397,341 B2
(45) Date of Patent: Jul. 26, 2022

(54) OPTICAL MODULATOR HAVING SCREW-FASTENED PROTRUSION

(71) Applicant: SUMITOMO OSAKA CEMENT CO., LTD, Tokyo (JP)

(72) Inventors: Norikazu Miyazaki, Tokyo (JP); Toru Sugamata, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 133 days.

(21) Appl. No.: 16/961,419

(22) PCT Filed: Jan. 11, 2019

(86) PCT No.: PCT/JP2019/000764
§ 371 (c)(1),
(2) Date: Jul. 10, 2020

(87) PCT Pub. No.: WO2019/139144
PCT Pub. Date: Jul. 18, 2019

(65) Prior Publication Data
US 2020/0379279 A1  Dec. 3, 2020

(30) Foreign Application Priority Data

Jan. 12, 2018 (JP) .............................. JP2018-003443

(51) Int. Cl.
*G02F 1/03* (2006.01)
*G02F 1/035* (2006.01)
(Continued)

(52) U.S. Cl.
CPC ............ *G02F 1/0305* (2013.01); *G02F 1/035* (2013.01); *G02F 1/2252* (2013.01);
(Continued)

(58) Field of Classification Search
CPC ...... G02F 1/0305; G02F 1/035; G02F 1/2252; G02F 1/212; G02F 2202/20; H04B 10/5561; H04B 10/25; H04B 10/505
See application file for complete search history.

(56) References Cited

U.S. PATENT DOCUMENTS 7,099,592 B2 * 8/2006 Snawerdt ............. G02B 6/4453
398/183
11,156,857 B2 * 10/2021 Miyazaki ................ G02F 1/035
(Continued)

FOREIGN PATENT DOCUMENTS

| JP | 2003-258363 | 9/2003 |
| JP | 2014-178383 | 9/2014 |
| JP | 2017-134131 | 8/2017 |

OTHER PUBLICATIONS

International Search Report, dated Mar. 19, 2019 (Mar. 19, 2019), 1 page.

*Primary Examiner* — Andrew Jordan
(74) *Attorney, Agent, or Firm* — Rankin, Hill & Clark LLP

(57) ABSTRACT

An initial change and a secular change in an optical characteristic and a high frequency characteristic in a case where an optical modulator is mounted in a package of an optical transmission apparatus are suppressed while improving a space utilization rate in the package of the optical transmission apparatus. An optical modulator that is electrically connected to an electric circuit configured on a circuit board, includes: a package that houses an optical modulation element; and a signal input part or the like for inputting an electric signal for causing the optical modulation element to perform an modulation operation from the electric circuit, in which the package has, on a part of a bottom surface facing the circuit board, a first protrusion portion protruding from
(Continued)

the bottom surface, and the signal input part is provided on an upper surface of the first protrusion portion.

6 Claims, 6 Drawing Sheets

(51) Int. Cl.
    *G02F 1/225*     (2006.01)
    *H04B 10/556*     (2013.01)
    *H04B 10/25*     (2013.01)
    *G02F 1/21*     (2006.01)

(52) U.S. Cl.
    CPC ......... *H04B 10/5561* (2013.01); *G02F 1/212* (2021.01); *G02F 2202/20* (2013.01); *H04B 10/25* (2013.01)

(56) References Cited

U.S. PATENT DOCUMENTS

| | | | |
|---|---|---|---|
| 2019/0098744 A1* | 3/2019 | Miyazaki | ................ H01R 12/62 |
| 2020/0379279 A1* | 12/2020 | Miyazaki | .............. G02F 1/2252 |

* cited by examiner

OPTICAL MODULATOR HAVING SCREW-FASTENED PROTRUSION

TECHNICAL FIELD

The present invention relates to an optical modulator, and an optical transmission apparatus and an optical transmitter using the optical modulator.

BACKGROUND ART

In recent years, a digital coherent transmission technique, which has been started to be applied to long-distance optical communication, is also being applied to metro optical communication such as medium-distance and short-distance due to a further increase in communication demand. In such digital coherent transmission, a DP-QPSK (Dual Polarization-Quadrature Phase Shift Keying) modulator using a LiNbO3 (hereinafter referred to as LN) substrate is typically used as an optical modulator. Hereinafter, an optical modulator using a LiNbO3 substrate will be referred to as an LN modulator.

Such an optical modulator is used, for example, as an optical transmitter to which a driver element (or a drive circuit) that outputs an electric signal for causing the optical modulator to perform a modulation operation is connected. Further, generally, the optical modulator or the driver element is disposed on a circuit board.

In particular, with regard to optical transmitters for short-distance applications such as optical communication for metropolitan, there is a strong demand for a reduction of an installation space for an optical modulator, a driver circuit, or the like, and downsizing of a modulator or the like is desired. In order to downsize the optical modulator, efforts such as downsizing of an LN optical modulation element (for example, a reduction of an optical waveguide disposition area on an LN substrate), downsizing of a space optical system for optically coupling output light from an optical waveguide on an LN substrate to an output optical fiber, and downsizing of a radio frequency (RF) signal input interface of an LN modulator (for example, a change from a coaxial connector to a flexible printed board) have been performed in the related art.

Further, in addition to the downsizing of the optical modulator alone as described above, in order to improve a space utilization rate in an optical transmission apparatus, it has been considered to provide a cutout in a package of the optical modulator and dispose electronic components of the driver circuit in a space secured by the cutout (refer to, for example, Patent Literature No. 1).

However, according to the knowledge of the inventors of the present invention, if an optical modulator of the related art having a cutout provided in a package is fixed to a circuit board in an optical transmission apparatus with screws, after the screw fixation, a problem such as deterioration of an optical characteristic such as light passage loss of the optical modulator, or fluctuation (deterioration) over time of the optical characteristic may occur.

Further, in addition to the change or deterioration of the optical characteristic as described above, a problem of a change or deterioration of a high frequency characteristic of the optical modulator may occur.

The causes of these problems are considered to be the occurrence of processing distortion due to the cutout provided in the package of the optical modulator (for example, the occurrence of a processing deformation portion that reduces the flatness of the bottom surface of the package), the uneven distribution of the processing distortion, and the influence of fixing stress which is generated when fixing the package with screws.

That is, in the case of a configuration in which a cutout is provided in a part of a package of an optical modulator in order to secure a space for disposition of electric components, as in the optical modulator described in Patent Literature No. 1, for example, processing distortion (also referred to as package distortion) or uneven distribution of processing distortion may occur in the package during a cutting process for forming the cutout, or the like. Then, in a case where the package in which such processing distortion has occurred is fixed to the circuit board with screws, minute deformation may occur in the package depending on the state of the processing distortion, the magnitude of a fastening force at the time of the screw fixation, the magnitude of stress, and the like. Further, if a high-frequency driver IC or the like, which generates heat, is disposed in the cutout portion, a heating element can be disposed in the immediate vicinity of the package, and thus the package distortion can be further increased due to a temperature rise of the heating element. Further, if the package is maintained in a high temperature state as the optical transmission apparatus operates for a long period of time, the above-mentioned package distortion or minute deformation can change and expand over time.

Then, the minute deformation that has occurred in the package causes deformation of the LN substrate housed in the package, or a change in the positional relationship between optical components such as lenses that configures the space optical system, and causes a problem of deterioration of the optical characteristic of the optical modulator. Further, in addition to this, the minute deformation of the package also changes the connection state between a radio frequency connector and a circuit board, which may cause deterioration of optical transmission characteristics, for example, in a configuration in which the radio frequency connector is rigidly provided in the package, as in the optical modulator disclosed in Patent Literature No. 1.

On the other hand, it is difficult to sufficiently suppress the occurrence of the processing distortion of the optical modulator package described above, or the change in the stress balance that occurs when the package is fixed to the circuit board with screws, only by devising the processing conditions when performing the cutout processing, the manufacturing conditions in the assembly process when fixing the optical modulator to the circuit board with screws, or the like (for example, reducing variation in processing conditions).

CITATION LIST

Patent Literature

[Patent Literature No. 1] Japanese Laid-open Patent Publication No. 2017-134131

SUMMARY OF INVENTION

Technical Problem

From the above background, an object of the present invention is to suppress an initial change and a secular change in optical characteristic and high frequency characteristic in a case where an optical modulator is mounted in an optical transmission apparatus, while improving a space utilization rate in the optical transmission apparatus.

Solution to Problem

According to an aspect of the present invention, there is provided an optical modulator that is electrically connected to an electric circuit configured on a circuit board, the optical modulator including: a package that houses an optical modulation element; and a signal input part that inputs an electric signal for causing the optical modulation element to perform a modulation operation from the electric circuit, in which the package has, on a part of a bottom surface facing the circuit board, a first protrusion portion protruding from the bottom surface, and the signal input part is provided on an upper surface of the first protrusion portion.

According to another aspect of the present invention, the package has at least one screw hole on the upper surface of the first protrusion portion.

According to another aspect of the present invention, the bottom surface of the package has at least one screw hole in a portion other than the first protrusion portion.

According to another aspect of the present invention, the package has a second protrusion portion protruding from the bottom surface on a part of the bottom surface, and the first protrusion portion and the second protrusion portion have substantially the same height from the bottom surface.

According to another aspect of the present invention, the package has at least one screw hole on an upper surface of the second protrusion portion.

Another aspect of the present invention, there is provided an optical transmission apparatus including: the optical modulator according to any one of the above aspects; and the circuit board that outputs an electric signal for causing the optical modulator to perform a modulation operation.

According to another aspect of the present invention, the optical transmission apparatus further includes at least one spacer disposed between the bottom surface of the optical modulator and the circuit board and having a height equal to a height of the first protrusion portion from the bottom surface.

This specification includes all the contents of Japanese Patent Application No. 2018-003443 filed on Jan. 12, 2018.

DESCRIPTION OF EMBODIMENTS

Hereinafter, embodiments of the present invention will be described with reference to the drawings.

First Embodiment

Figure 1:
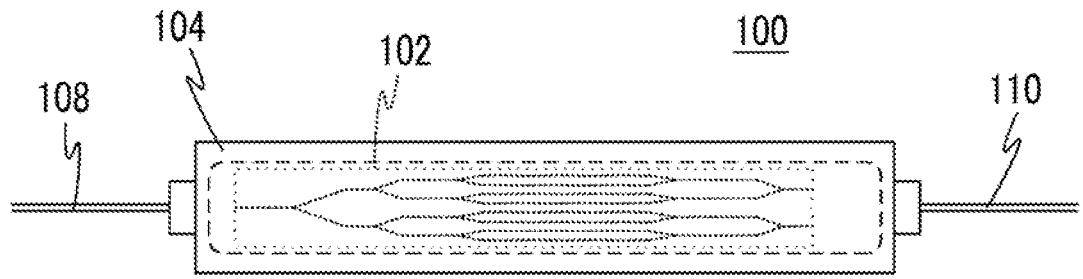
FIG. 1 is a plan view of an optical modulator according to a first embodiment of the present invention.
Figure 2:
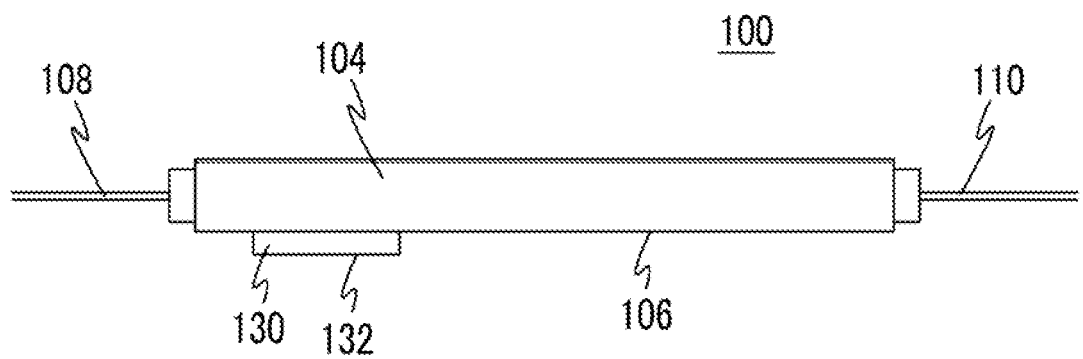
FIG. 2 is a front view of the optical modulator according to the first embodiment of the present invention.
Figure 3:
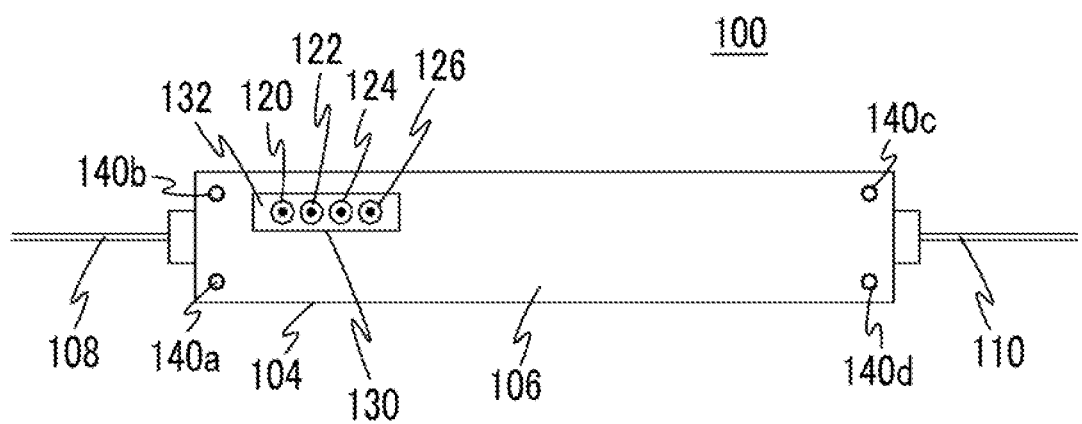
FIG. 3 is a bottom view of the optical modulator according to the first embodiment of the present invention.

First, an optical modulator according to a first embodiment of the present invention will be described. FIG. 1 is a plan view showing the configuration of an optical modulator 100 according to the first embodiment of the present invention, FIG. 2 is a front view of the optical modulator 100, and FIG. 3 is a bottom view of the optical modulator 100. The optical modulator 100 is mounted on, for example, an external circuit board (for example, a circuit board 404 shown in FIG. 4 described later) on which an electric circuit for causing the optical modulator 100 to perform modulation is configured, and used by being electrically connected to the electric circuit.

The optical modulator 100 includes an optical modulation element 102, a package 104 that houses the optical modulation element 102, an optical fiber 108 for inputting light to the optical modulation element 102, and an optical fiber 110 that leads the light that is output from the optical modulation element 102 to the outside of the package 104.

The optical modulation element 102 is an optical modulation element that is used in a DP-QPSK optical modulator or the like, which includes four Mach-Zehnder type optical waveguides provided on an LN substrate, for example, and four radio frequency electrodes (RF electrodes) respectively provided on the Mach-Zehnder type optical waveguides and modulating light waves propagating in the optical waveguides. The two lights that are output from the optical modulation element 102 are polarization-combined by, for example, a lens optical system (not shown) housed in the package 104, and led to the outside of the package 104 through the optical fiber 110.

The package 104 includes four socket electrodes 120, 122, 124, and 126 respectively connected to the four RF electrodes (not shown) that the optical modulation element 102 has. The socket electrodes 120, 122, 124, and 126 configure female type radio frequency connectors (RF connectors), and corresponding four signal pins provided on an external circuit board are inserted into the socket electrodes, whereby an electric signal (radio frequency signal) from an electric circuit configured on the external circuit board is input thereto.

That is, the socket electrodes 120, 122, 124, and 126 are equivalent to signal input parts for inputting an electric signal for causing the optical modulation element 102 to perform a modulation operation from the electric circuit configured on the external circuit board. In this embodiment, the signal input part is described as a female socket type electrode. However, it may be a male type or may be a type having a signal pin extending from the package 104. Further, a normal optical modulator is provided with not only an RF part to which a radio frequency signal is input but also a dc signal input part that is used for bias control or the like. However, in this embodiment, it is not particularly shown.

Further, in the optical modulator 100 of this embodiment, a part of a bottom surface 106 of the package 104, which faces the circuit board on which the optical modulator 100 is mounted, is provided with a protrusion portion 130, which is a first protrusion portion protruding from the bottom surface 106 (FIGS. 2 and 3). Then, the socket electrodes 120, 122, 124, and 126, which are signal input parts, are provided on an upper surface (top surface) 132 of the protrusion portion 130.

Further, screw holes 140a, 140b, 140c, and 140d are provided in regions where the protrusion portion 130 is not provided, on the bottom surface 106 of the package 104.

Figure 4:
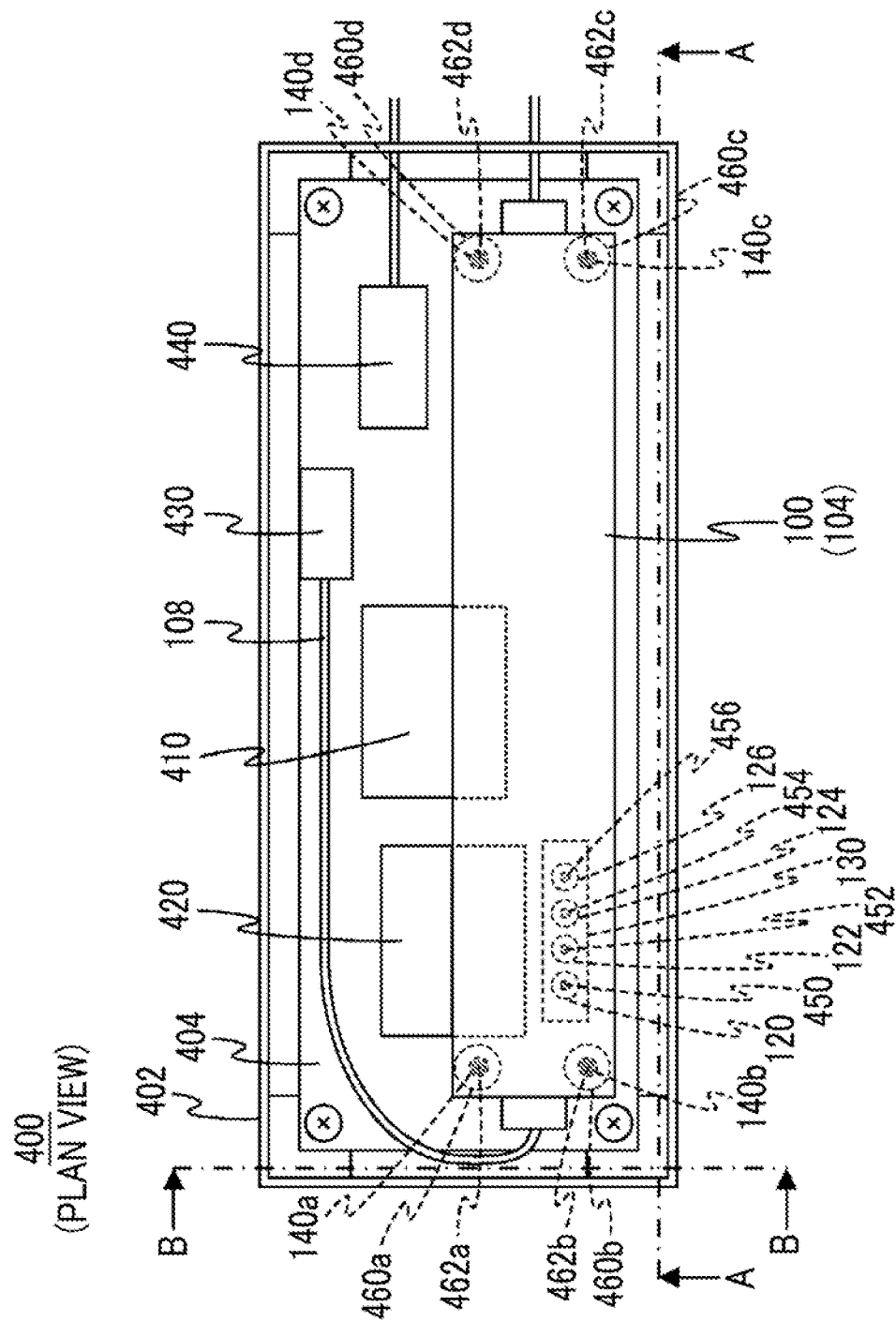
FIG. 4 is a plan view of an optical transmission apparatus in which the optical modulator according to the first embodiment of the present invention is mounted.

Next, an example of mounting the optical modulator 100 on the external circuit board will be described. FIG. 4 is a plan view of an optical transmission apparatus 400 in which the optical modulator 100 is mounted. Further, FIGS. 5 and 6 respectively are sectional views taken along line A-A and line B-B and viewed in the direction of an arrow, of the optical transmission apparatus shown in FIG. 4.

The optical transmission apparatus 400 includes a circuit board 404 fixed inside a package 402, and the optical modulator 100 is mounted on the circuit board 404. Since the optical modulator 100 and the circuit board 404 are housed in the package 402, the optical modulator 100 and the circuit board 404 cannot be visually recognized from the outside of the package 402. However, in FIG. 4, for description, portions housed in the package 402 are also shown by using solid lines, except for the portion of the circuit board 404 hidden by the package 104 of the optical modulator 100.

A DSP (Digital Signal Processor) 410, a DRV (Driver) 420, an LD (Laser Diode) 430, a PD (Photo Diode) 440, and other electronic components (not shown) are mounted on the circuit board 404. The DSP 410 is an arithmetic processing device for executing processing of digital signals. The DRV 420 is an electric circuit for driving the optical modulator 100. The LD 430 inputs laser light to the optical modulator 100 through the optical fiber 108. The PD 440 is installed for receiving a digital coherent optical signal. The electric components mounted on the circuit board 404 are examples, and other electric components other than the above may be mounted.

Figure 5:
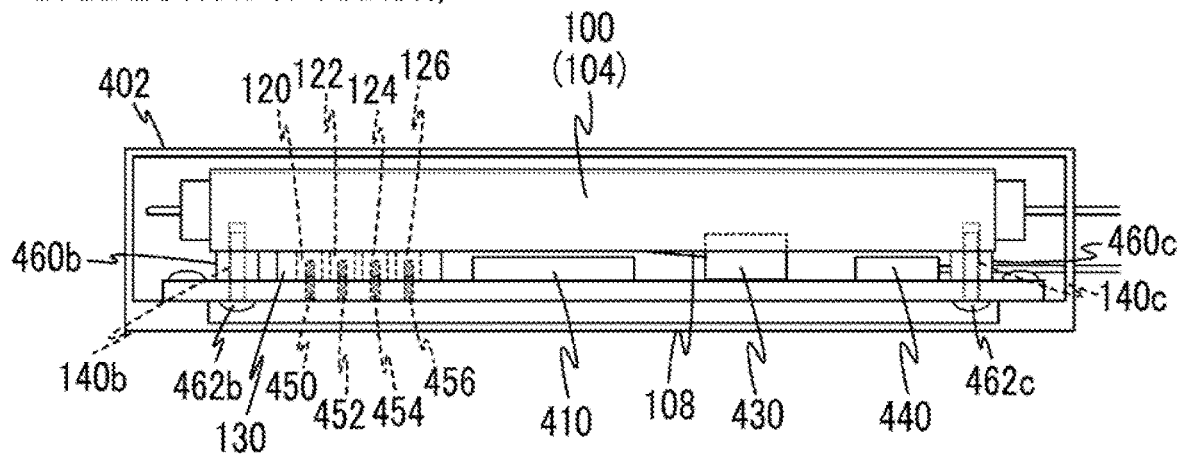
FIG. 5 is a sectional view taken along line A-A and viewed in the direction of an arrow, of the optical transmission apparatus shown in FIG. 4.
Figure 6:
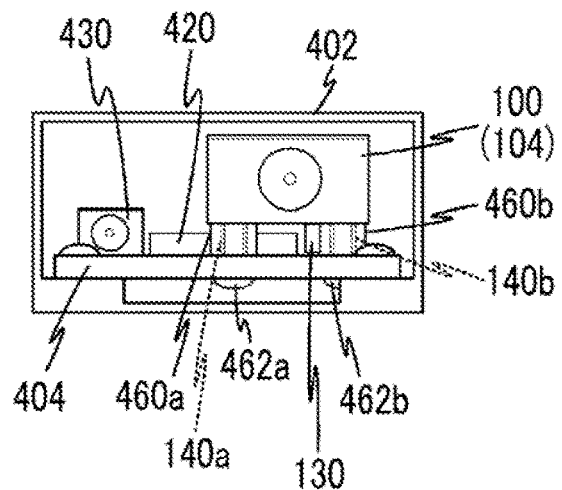
FIG. 6 is a sectional view taken along line B-B and viewed in the direction of an arrow, of the optical transmission apparatus shown in FIG. 4.

The output of the DRV 420 is output from electrode pins 450, 452, 454, and 456 provided on the circuit board 404. The electrode pins 450, 452, 454, and 456 are provided on the circuit board 404 so as to extend to stand upward (in the drawing) from the component mounting surface (upper surface in the drawing) of the circuit board 404, as shown in FIG. 5, from a conductor pattern for signal output of the DRV 420 mounted on the circuit board 404. The socket electrodes 120, 122, 124, and 126 provided in the protrusion portion 130 are fitted to the electrode pins 450, 452, 454, and 456 provided on the circuit board 404, whereby the optical modulator 100 is electrically connected to the DRV 420.

Further, the screw holes 140a, 140b, 140c, and 140d of the package 104 are fastened to screws 462a, 462b, 462c, and 462d inserted into the circuit board 404 through pipe-shaped spacers 460a, 460b, 460c, and 460d disposed at the respective positions of these screw holes, whereby the optical modulator 100 is fixed to the circuit board 404.

The height of each of the spacers 460a, 460b, 460c, and 460d is equal to or higher than the height of the protrusion portion 130 measured from the bottom surface 106 (the surface facing the circuit board 404) of the package 104 of the optical modulator 100, and due to the protrusion portion 130 and the spacers 460a, 460b, 460c, and 460d, amounting space for electric components such as the DSP 410 or the DRV 420 is secured between the bottom surface 106 of the optical modulator 100 and the circuit board 404. In this way, a space utilization rate in the package 402 of the optical transmission apparatus 400 is improved.

In particular, the bottom surface 106 of the package 140 of the optical modulator 100 according to this embodiment is not provided with a cutout as in the related art, and the protrusion portion 130 is provided at apart thereof. Therefore, in the optical modulator 100, most of the areas of the bottom surface 106 of the package 104 can be configured as a uniform plane. Here, the protrusion portion 130 can be provided only in a region having the minimum area necessary for housing the socket electrodes 120, 122, 124, and 126, which are signal input parts, and thus the occurrence of processing distortion or uneven distribution of the processing distortion can be suppressed to the minimum. Therefore, disturbance of the uniformity of the bottom surface 106 due to the protrusion portion 130 can be minimized.

As a result, in the optical modulator 100, the occurrence of the processing distortion of the package 104 is minimized, whereby it is possible to suppress the occurrence of minute deformation of the package 104 in a case where the optical modulator 100 is fixed onto the circuit board 404 of the optical transmission apparatus 400, and suppress an initial change in the optical characteristic of the optical modulator 100 and a secular change in the optical characteristic due to a secular change in deformation stress.

Further, in the optical modulator 100, the socket electrodes 120, 122, 124, are 126, which are signal input parts to which an electric signal (radio frequency signal) for causing the optical modulator 100 to perform an optical modulation operation is input, are provided on the upper surface (top surface) 132 of the protrusion portion 130 protruding from the bottom surface 106 of the package 104. For this reason, in the optical modulator 100, the electrode pins 450, 452, 454, and 456 standing from the conductor pattern for signal output of a drive circuit configured on the circuit board 404 respectively are in contact with and electrically connected to the socket electrodes 120, 122, 124, and 126 of the optical modulator 100, in the immediate vicinity of the corresponding conductor pattern.

That is, in the optical modulator 100, the distance between the conductor pattern for signal output of the drive circuit configured on the circuit board 404 and the signal input part (socket electrode 120 or the like) of the optical modulator 100 (therefore, the propagation distance of the radio frequency signal which is output from the drive circuit) can be significantly reduced compared to an optical modulator of the related art (for example, the optical modulator disclosed in Patent Literature No. 1). Therefore, the deformation when the package is fixed can also be made small between the conductor pattern and the signal input part, the disturbance of the high frequency characteristic can be reduced, and the initial change and the secular change in the high frequency characteristic can also be suppressed.

The height of each of the spacers 460a, 460b, 460c, and 460d can be set to, for example, a height in which a minus tolerance is zero with respect to the height of the protrusion portion 130 such that stress is not applied to the protrusion portion 130 when the screws 462a, 462b, 462c, and 462d are fastened, or a height higher than the height of the protrusion portion 130 by a predetermined dimension.

Further, in this embodiment, the four spacers 460a, 460b, 460c, and 460d are used in correspondence with all the four screw holes 140a, 140b, 140c, and 140d. However, there is no limitation thereto. For example, a spacer (460a or the like) may be used for at least one of the four screw holes 140a, 140b, 140c, and 140d. Even with such a configuration, the mounting space for the electric components can be secured between the bottom surface 106 and the circuit board 404 by the spacer and the protrusion portion 130.

Further, in this embodiment, the four screw holes 140a, 140b, 140c, and 140d are provided at the four corners of the bottom surface 106, which are portions other than the portion of the bottom surface 106, where the protrusion portion 130 is provided in. However, there is no limitation thereto. With respect to the number and disposition of the screw holes which are provided in the portions other than the portion of the bottom surface 106, where the protrusion portion 130 is provided, any number of one or more and any disposition can be adopted as long as the mounting space for electric components can be secured between the bottom surface 106 and the circuit board by using the spacer 460a or the like in the portion of the screw hole.

Second Embodiment

Figure 7:
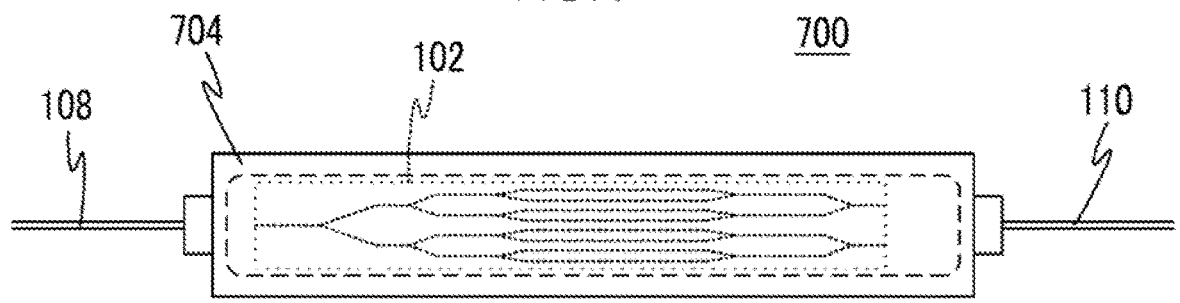
FIG. 7 is a plan view of an optical modulator according to a second embodiment of the present invention.
Figure 8:
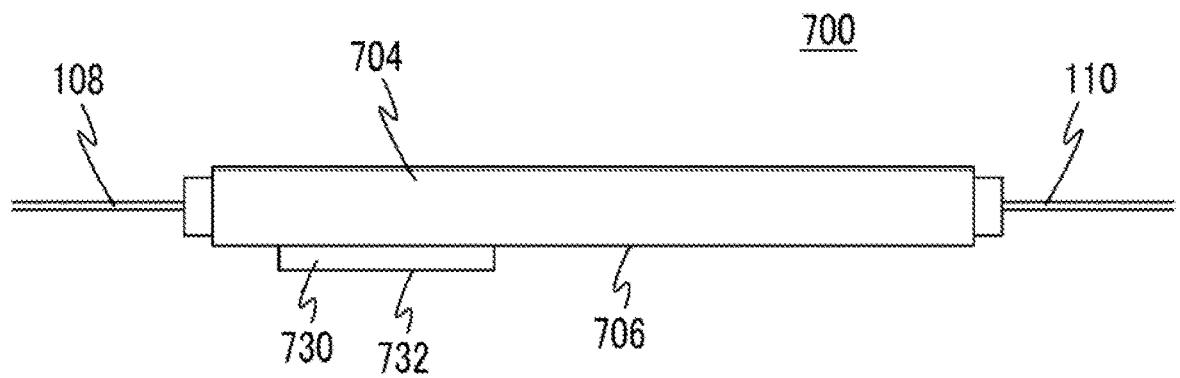
FIG. 8 is a front view of the optical modulator according to the second embodiment of the present invention.
Figure 9:
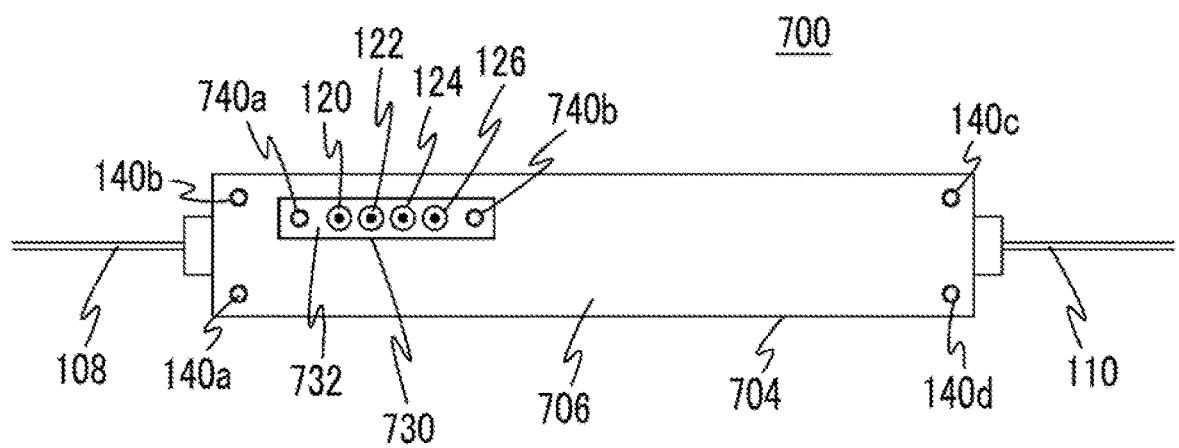
FIG. 9 is a bottom view of the optical modulator according to the second embodiment of the present invention.

Next, an optical modulator according to a second embodiment of the present invention will be described. FIGS. 7, 8, and 9 respectively are a plan view, a front view, and a bottom view showing the configuration of an optical modulator 700 according to the second embodiment of the present invention, and respectively correspond to FIGS. 1, 2, and 3 showing the configuration of the optical modulator 100 according to the first embodiment. In FIGS. 7, 8, and 9, with respect to the same components as those of the optical modulator 100 shown in FIGS. 1, 2, and 3, the description with respect to FIGS. 1, 2, and 3 described above is incorporated herein.

The optical modulator 700 according to the second embodiment has the same configuration as the optical modulator 100 according to the first embodiment, except that the optical modulator 700 has a package 704 instead of the package 104. The package 704 has the same configuration as the package 104, except that as the first protrusion portion, a protrusion portion 730 is provided instead of the protrusion portion 130. Similarly to the protrusion portion 130, the protrusion portion 730 protrudes from a part of the bottom surface 706 of the package 704, which faces the circuit board on which the optical modulator 700 is mounted, and the socket electrodes 120, 122, 124, and 126 which are signal input parts are provided on an upper surface (top surface) 732 thereof (FIGS. 8 and 9).

However, unlike the protrusion portion 130, the protrusion portion 730 is further provided with screw holes 740a and 740b on the upper surface 732 thereof. In this embodiment, the screw holes 740a and 740b are provided at positions sandwiching the four socket electrodes 120, 122, 124, and 126 disposed in a line on the upper surface 732 from respective ends in an arrangement direction thereof.

In this way, in the optical modulator 700, when electrical connection to the drive circuit (electric circuit) configured on the external circuit board through the socket electrodes 120, 122, 124, and 126 is made, the protrusion portion 730 can be stably fixed to the circuit board including the respective intervals by using the screw holes 740a and 740b at positions extremely close to the radio frequency connector part. As a result, the distance between the conductor pattern for signal output of the drive circuit configured on the circuit board and the signal input part (socket electrode 120 or the like) of the optical modulator 700 (therefore, the propagation distance of the radio frequency signal which is output from the drive circuit) can be installed and maintained more stably than in the case of the optical modulator 100 according to the first embodiment, and the secular change in the high frequency characteristic of the optical modulator 700 can be suppressed even better.

In this embodiment, on the upper surface 732 of the protrusion portion 730, the two screw holes 740a and 740b are provided at positions sandwiching the socket electrodes 120, 122, 124, and 126 from respective ends in the arrangement direction thereof. However, there is no limitation thereto. For example, the number of screw holes which are provided on the upper surface 732 may be any number of one or more, and the disposition of these screw holes on the upper surface 732 may also be optional.

Third Embodiment

Figure 10:
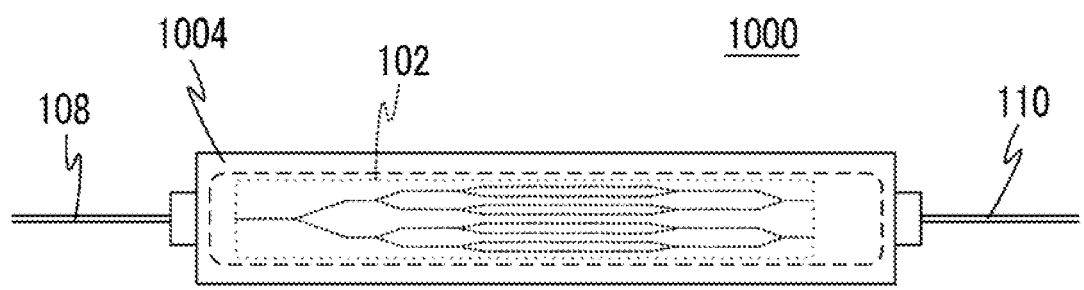
FIG. 10 is a plan view of an optical modulator according to a third embodiment of the present invention.
Figure 11:
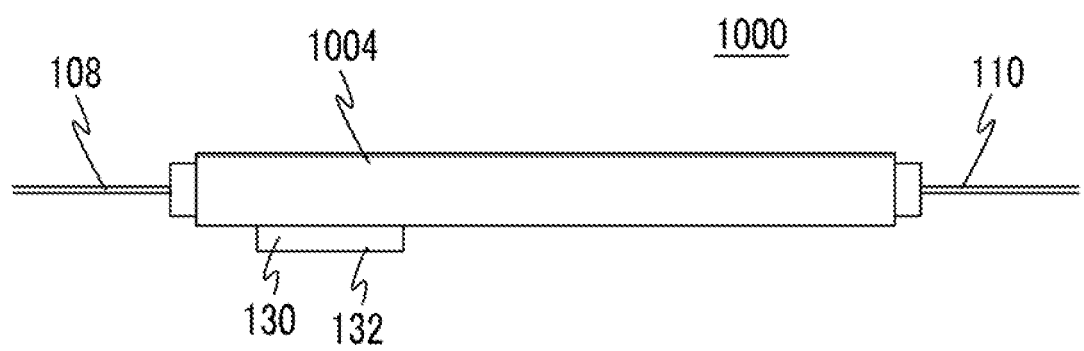
FIG. 11 is a front view of the optical modulator according to the third embodiment of the present invention.
Figure 12:
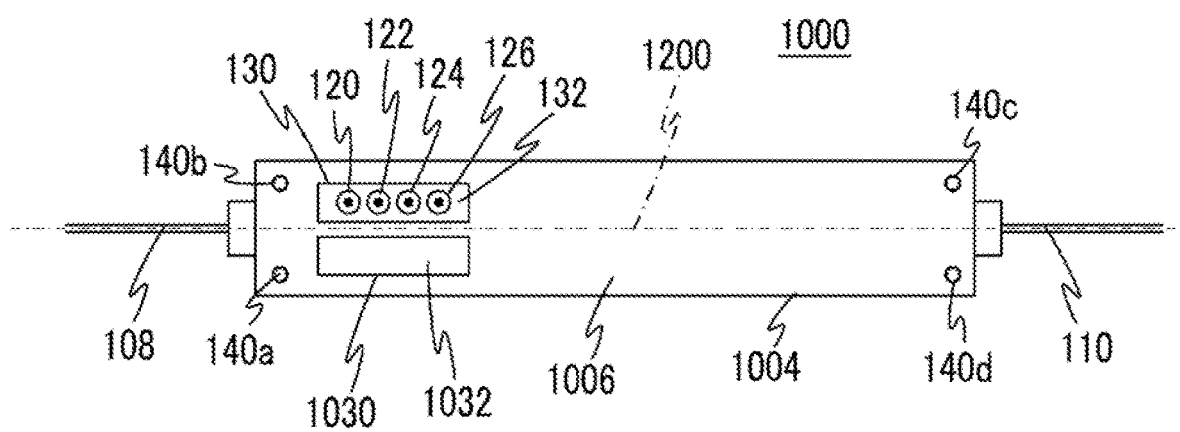
FIG. 12 is a bottom view of the optical modulator according to the third embodiment of the present invention.
Figure 13:
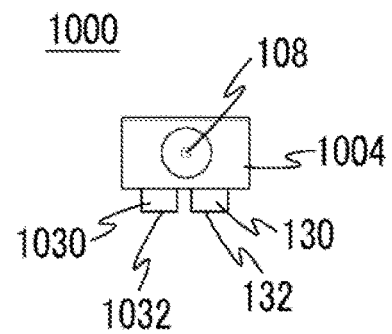
FIG. 13 is a left side view of the optical modulator shown in FIG. 12.

Next, an optical modulator according to a third embodiment of the present invention will be described. FIGS. 10, 11, and 12 respectively are a plan view, a front view, and a bottom view showing the configuration of an optical modulator 1000 according to the third embodiment of the present invention, and respectively correspond to FIGS. 1, 2, and 3 showing the configuration of the optical modulator 100 according to the first embodiment. Further, FIG. 13 is a left side view of the optical modulator 1000 shown in FIG. 11 with respect to the front view of the optical modulator 1000.

In FIGS. 10, 11, and 12, with respect to the same components as those of the optical modulator 100 shown in FIGS. 1, 2, and 3, the description with respect to FIGS. 1, 2, and 3 described above is incorporated herein.

The optical modulator 1000 according to the third embodiment has the same configuration as the optical modulator 100 according to the first embodiment, except that the optical modulator 1000 has a package 1004 instead of the package 104. The package 1004 has the same configuration as the package 104, except that the package 1004 further includes a protrusion portion 1030 in addition to the protrusion portion 130.

The protrusion portion 1030 is a second protrusion portion configured to protrude from a part of a bottom surface 1006 of the package 1004 similarly to the protrusion portion 130 that is the first protrusion portion, and a height from the bottom surface 1006 is equal to the height of the protrusion portion 130. In this way, in the optical modulator 1000, the protrusion portion 1030 that is the second protrusion portion is provided, whereby the facing areas (for example, contact areas) of the optical modulator 1000 and the circuit board are expanded, and thus the optical modulator 1000 can be more stably mounted on the circuit board.

In this embodiment, as shown in FIG. 12, the protrusion portion 1030, which is the second protrusion portion, is provided at a position symmetrical to the protrusion portion 130 that is the first protrusion portion, with respect to a center line 1200 in a width direction of the package 1004, which extends in the length direction of the package 1004. However, there is no limitation thereto. Even if the protrusion portion 1030 is disposed at any position irrelevant to the disposition of the protrusion portion 130, the optical modulator 1000 can be more stably mounted on the circuit board.

Further, if the protrusion portion 1030 and the protrusion portion 130 are disposed substantially symmetrically, as shown in FIG. 12, the package 1004 has a symmetrical structure, and thus uneven distribution of the processing distortion of the package 1004, which occurs during processing of the package 1004, is further reduced compared to the case of the package 104, and the remaining processing stress can also be made symmetrical. As a result, the occurrence of minute deformation due to uneven distribution of the processing distortion in the package 1004 of the optical modulator 1000 when fixing the optical modulator 1000 onto the circuit board can be further suppressed, which is a more preferable example. For this reason, in the optical modulator 1000, it is possible to further suppress the initial changes in the optical characteristic and/or the high frequency characteristic at the time of mounting on the circuit board, and the secular changes of these characteristics.

Further, in general, in a DP-QPSK modulator which is an example of an optical modulator to which the configuration of the optical modulator 100, 700, or 1000 can be applied, a configuration is made such that two output lights from the optical modulation element 102 propagate along the center line 1200 in the width direction of the package 104, 704, or 1004 and in a symmetrical disposition with respect to the centerline 1200. Then, an optical element such as a lens for combining the two output lights and leading the combined light to the optical fiber 108 is often disposed symmetrically with respect to the center line 1200 in the width direction.

Therefore, if the package 104, 704, or 1004 has a symmetrical structure as in this embodiment, so that shape changes that can occur in the package become symmetrical with respect to the center line 1200, the secular change in optical characteristic or the temperature change in the optical modulator 100, 700, or 1000 can be more effectively suppressed compared to a case where these packages have an asymmetric structure.

In this embodiment, the configuration is made in which the upper surface 132 of the protrusion portion 130 and the upper surface 1032 of the protrusion portion 1030 are not provided with screw holes. However, there is no limitation thereto. For example, the upper surface 132 and/or the upper surface 1032 may be provided with at least one screw hole, and the protrusion portion 130 and/or the protrusion portion 1030 may be fastened to the circuit board with screws. In this way, similarly to the optical modulator 700 in the second embodiment, the distance between the conductor pattern for signal output of the drive circuit configured on the circuit board and the signal input part (socket electrode 120 or the like) of the optical modulator 1000 is more stably maintained, and thus the secular change in the high frequency characteristic of the optical modulator 1000 can be suppressed even better.

In each of the embodiments described above, the optical modulator which includes an optical modulation element having four RF electrodes using LN as a substrate is shown. However, the present invention is not limited to this, and can also be likewise applied to an optical modulator having a number of RF electrodes other than four and/or an optical modulator using a material other than LN as a substrate.

REFERENCE SIGNS LIST 100, 700, 1000: optical modulator
102: optical modulation element
104, 704, 1004: package
106, 706, 1006: bottom surface
108, 110: optical fiber
120, 122, 124, 126: socket electrode
130, 730, 1030: protrusion portion
132, 732: upper surface
140a, 140b, 140c, 140d, 740a, 740b: screw hole
400: optical transmission apparatus
402: package
404: circuit board
450, 452, 454, 456: electrode pin
460a, 460b, 460c, 460d: spacer
462a, 462b, 462c, 462d: screw
1200: center line in a width direction.

The invention claimed is:

1. An optical modulator that is electrically connected to an electric circuit configured on a circuit board, the optical modulator comprising:
   a package that houses an optical modulation element; and
   a signal input part that inputs an electric signal for causing the optical modulation element to perform a modulation operation from the electric circuit,
   wherein the package has, on a part of a bottom surface facing the circuit board, a first protrusion portion protruding from the bottom surface,
   the signal input part is provided on an upper surface of the first protrusion portion, and
   the package has at least one screw hole, to be used to fix the first protrusion portion to the circuit board, on the upper surface of the first protrusion portion having the signal input part to which a radio frequency signal is input.

2. The optical modulator according to claim 1, wherein the bottom surface of the package has at least one screw hole in a portion other than the first protrusion portion.

3. The optical modulator according to claim 1, wherein the package has a second protrusion portion protruding from the bottom surface on a part of the bottom surface, and
   the first protrusion portion and the second protrusion portion have substantially the same height from the bottom surface.

4. The optical modulator according to claim 3, wherein the package has at least one screw hole on an upper surface of the second protrusion portion.

5. An optical transmission apparatus comprising:
   the optical modulator according to claim 1; and
   the circuit board that outputs an electric signal for causing the optical modulator to perform a modulation operation.

6. The optical transmission apparatus according to claim 5, further comprising:
   at least one spacer disposed between the bottom surface of the optical modulator and the circuit board and having a height equal to a height of the first protrusion portion from the bottom surface.

* * * * *